(12) United States Patent
Wallace et al.

(10) Patent No.: US 8,715,610 B2
(45) Date of Patent: May 6, 2014

(54) PROCESS FOR THE PREPARATION OF GRAPHENE

(75) Inventors: Gordon George Wallace, Gwynneville (AU); Dan Li, Glen Waverley (AU)

(73) Assignee: University of Wollongong (AU)

( * ) Notice: Subject to any disclaimer, the term of this patent is extended or adjusted under 35 U.S.C. 154(b) by 228 days.

(21) Appl. No.: 12/738,758

(22) PCT Filed: Oct. 17, 2008

(86) PCT No.: PCT/AU2008/001543
§ 371 (c)(1),
(2), (4) Date: Aug. 11, 2010

(87) PCT Pub. No.: WO2009/049375
PCT Pub. Date: Apr. 23, 2009

(65) Prior Publication Data
US 2010/0303706 A1    Dec. 2, 2010

(30) Foreign Application Priority Data

Oct. 19, 2007 (AU) ................................ 2007905796

(51) Int. Cl.
*C01B 31/04* (2006.01)
*C09C 1/56* (2006.01)

(52) U.S. Cl.
USPC ............................ 423/448; 423/460; 977/847

(58) Field of Classification Search
USPC ................................................. 423/448, 460
See application file for complete search history.

(56) References Cited

U.S. PATENT DOCUMENTS

| 2,798,878 | A | 7/1957 | Hummers, Jr. | |
| 6,262,304 | B1* | 7/2001 | Hashimoto et al. | 564/232 |
| 2006/0204427 | A1* | 9/2006 | Ghenciu et al. | 423/445 B |
| 2008/0048152 | A1* | 2/2008 | Jang et al. | 252/378 R |
| 2008/0258359 | A1 | 10/2008 | Zhamu et al. | |
| 2008/0279756 | A1 | 11/2008 | Zhamu et al. | |

OTHER PUBLICATIONS

Bourlinos, et al., Graphite Oxide: Chemical Reduction to Graphite and Surface Modification with Primary Aliphatic Amines and Amino Acids, Langmuir 2003; 19: 6050-6055.*
Hamwi, et al., Some Chemical and Electrochemical Properties of Graphite Oxide, J. Phys. Chem. Solids. 1996; 57(6-8): 867-872.*
Stankovich, et al., Synthesis of graphene-based nanosheets via chemical reduction of exfoliated graphite oxide, Carbon 2007; 45: 1558-1565.*
Stankovich, et al., Stable aqueous dispersions of graphitic nanoplatelets via the reduction of exfoliated graphite oxide in the presence of poly(sodum 4-styrenesulfonate), J. Mater. Chem 2006; 16: 155-158.*
Li, et al., Processable aqueous dispersions of graphene nanosheets, Nature Nanotechnology 2008; 3: 101-105 (published online Jan. 27, 2008).*
Scientific Background on the Nobel Prize in Physics, published by the The Royal Swedish Academy of Sciences on Oct. 5, 2010 as revised on Nov. 29, 2010, pp. 1-10.*

(Continued)

*Primary Examiner* — Daniel C McCracken
(74) *Attorney, Agent, or Firm* — Baker & Hostetler LLP

(57) ABSTRACT

The present invention relates to a process for the preparation of graphene which can be used in the development of graphene paper or films, graphene-based composites and articles for nanoelectronics, nanocomposites, batteries, supercapacitors, hydrogen storage and bioapplications. This process comprises reducing purified exfoliated graphite oxide in the presence of a base.

24 Claims, 9 Drawing Sheets

(56) References Cited

OTHER PUBLICATIONS

Jiang, et al., Production of aqueous colloidal dispersions of carbon nanotubes, Journal of Colloid and Interface Science 2003; 260: 89-94.*
Dreyer, et al., The chemistry of graphene oxide, Chem. Soc. Rev. 2010; 39: 228-240.*
Brodie, "On the Atomic Weight of Graphite", Phil. Trans. Royal Soc. London Ser. A 149, Jan. 1, 1859, 249-259.
Correa-Duarte et al., "Fabrication and Biocompatibility of Carbon Nanotube-Based 3D Networks as Scaffolds for Cell Seeding and Growth", Nano Letters, Oct. 2004, 4(11), 2233-2236.
Decher, "Fuzzy Nanoassembles; Toward Layered Polymeric Multicomposites", Science, Aug. 29, 1997, 277(5330), 1232-1237.
Dikin et al., "Preparation and Characterization of Graphene Oxide Paper", Nature, Jul. 26, 2007, 448(7152), 457-460.
Dowell et al., "Tensile and Compressive Properties of Flexible Graphite Foils", Carbon, Mar. 1986, 24(3), 311-323.
Everett, "Basic Principles of Colloid Science", The Royal Society of Chemistry, 1988, 260 pages.
Gheith et al., "Single-Walled Carbon Nanotube Polyelectrolyte Multilayers and Freestanding Films as a Biocompatible Platform for Neuroprosthetic Implants", Adv. Mater., Nov. 2005, 17(22), 2663-2670.
Hammond, "Form and Function in Multilayer Assembly: New Applications at the Nanoscale", Adv. Mater, Aug. 2004, 16(15), 1271-1293.
Hummers et al., "Preparation of Graphite Oxide", J. Am. Chem. Soc., Mar. 1958, 80(6), 1339-1345 (first page only provided).
Jan et al., "Successful Differentiation of Mouse Neural Stem Cells on Layer-by-Layer Assembled Single-Walled Carbon Nanotubes Composite", Nano Letters, May 2007, 7(5), 1123-1128.
Kovtyukhova et al., "Layer-by-Layer Assembly of Ultrathin Composite Films From Micron-Sized Graphite Oxide Sheets and Polycations", Chem. Mater., Jan. 28, 1999, 11(3), 771-778.
Leng et al., "Influences of Density and Flake Size on the Mechanical Properties of Flexible Graphite", Carbon, Aug. 1998, 36(7-8), 875-881.
McAllister et al., "Single Sheet Functionalized Graphene by Oxidation and Thermal Expansion of Graphite", Chem. Mater., May 2007, 19(18), 4396-4404.
Skakalova et al., "Effect of Chemical Treatment on Electrical Conductivity, Infrared Absorption and Raman Spectra of Single-Walled Carbon Nanotubes", J. Phys. Chem. B., Apr. 21, 2005, 109(15), 7174-7181.
Stankovich et al., "Synthesis of Graphene-Based Nanosheets via Chemical Reduction of Exfoliated Graphite Oxide", Carbon, Jun. 2007, 45(7), 1558-1565.
Tang et al., "Biomedical Applications of Layer-by-Layer Assembly: From Biomimetics to Tissue Engineering", Adv. Mater., Nov. 2006, 18, 3203-3224.

* cited by examiner

PROCESS FOR THE PREPARATION OF GRAPHENE

CROSS REFERENCE TO RELATED APPLICATIONS

The present application is a National Phase Application of International Application No. PCT/AU2008/001543 filed Oct. 17, 2008, which claims priority to Australian Patent Application No. 2007905796 filed Oct. 19, 2007, which applications are incorporated herein fully by this reference.

FIELD

The present invention relates to a process for the preparation of graphene which can be used in the development of graphene paper or films, graphene-based composites and articles for nanoelectronics, nanocomposites, batteries, supercapacitors, hydrogen storage and bioapplications.

BACKGROUND

Graphene is essentially an individual layer of graphite. Graphene can also be thought of as a carbon nanotube unrolled as shown in FIG. 9.

Graphene sheets offer many extraordinary properties and are being investigated for use in nanoelectronics, nanocomposites, batteries, supercapacitors, hydrogen storage and bioapplications. The main limitation for the use of graphene sheets is the current inability to mass produce them. Like carbon nanotubes and many other nanomaterials, a key challenge in the synthesis and processing of bulk-quantity graphene sheets is aggregation. Graphene sheets with high specific surface area, unless well separated from each other, tend to form irreversible agglomerates or even restack to form graphite due to van der Waals interactions. This problem has been encountered in all previous efforts aimed at large-scale production of graphene through chemical conversion or thermal expansion/reduction.

The prevention of aggregation is of particular importance for graphene sheets because most of their unique properties are only associated with individual sheets. Aggregation can be reduced by the attachment of other molecules or polymers onto the sheets. However, the presence of foreign stabilisers is undesirable for most applications. New strategies to produce relatively clean graphene sheets in bulk quantity while keeping them individually separated are required.

Graphite, consisting of a stack of flat graphene sheets, is inexpensive and available in large quantities from both natural and synthetic sources. This ordinary carbon material is the most readily available and least expensive source for the production of graphene sheets. Mechanical cleavage of graphite originally led to the discovery of graphene sheets and is currently used in most experimental studies of graphene. However, the low productivity of this method makes it unsuitable for large-scale use. Chemical conversion from graphite appears to be a much more efficient approach to bulk production of graphene sheets at low cost. The solution-based route involves chemical oxidation of graphite to hydrophilic graphite oxide, which can be readily exfoliated as individual graphene oxide sheets by ultrasonication in water. Graphene oxide, which is electrically insulating, can be converted back to conducting graphene by chemical reduction, e.g. using hydrazine. Unfortunately, previous work has shown that unless stabilised by selected polymers, chemically converted graphene (CCG) sheets obtained through this method precipitate as irreversible agglomerates due to their hydrophobic nature. The resulting graphene agglomerates appear to be insoluble in water and organic solvents, making further processing difficult.

As shown with carbon nanotubes, the dispersion of nanomaterials in solution is crucial to advancing many technological applications. Owing to their hydrophobic nature, the direct dispersion of graphite or graphene sheets in water has been generally considered unattainable.

SUMMARY

We have now found that ordinary natural graphite, when treated appropriately by chemical means, can readily disperse in water to generate stable graphene and graphene dispersions without the need for any polymeric or surfactant stabilisers. Of great significance is that the successful formation of relatively pure graphene dispersions enables the use of conventional low-cost solution-phase processing techniques to create new graphene-based materials and devices.

In a first aspect, the present invention provides a process for the preparation of graphene or a graphene dispersion which comprises reducing purified exfoliated graphite oxide in the presence of a base.

In a second aspect, there is provided graphene or a graphene dispersion as prepared by the process defined above.

The graphene dispersion may be an aqueous graphene dispersion.

The process of the present invention results in the large scale preparation of the graphene or graphene dispersion which does not require presence of foreign polymermic or surfactant stablisisers which can be used in the development of graphene paper or films, graphene-based composites or articles for nanoelectronics, nanocomposites, batteries, supercapacitors, hydrogen storage and bioapplications.

It has been demonstrated that the graphene paper or film displays a remarkable combination of thermal, mechanical and electrical properties, whilst preliminary cytotoxicity tests suggest biocompatibility, making this material attractive for many potential applications.

In a third aspect there is provided a paper, film or composite which comprises the graphene as prepared by the process defined above.

In a fourth aspect, there is provided an article which is wholly or partly composed of the graphene prepared by the process defined above and/or the paper, film or composite defined above.

In a fifth aspect, there is provided a process for preparing a graphene paper or film which comprises filtration of the graphene dispersion prepared by the process defined above.

DETAILED DESCRIPTION

The present invention relates to a process for the preparation of graphene.

Graphene is essentially an individual layer of graphite or graphite nanoplatelets and is generally in the form of graphene sheets.

Graphite nanoplatelets have recently attracted considerable attention as a viable and inexpensive filler substitute for carbon nanotubes in nanocomposites, given the predicted excellent in-plane mechanical, structural, thermal and electrical properties of graphite. As with carbon nanotubes, full utilisation of graphite nanoplatelets in polymer nanocomposite applications will inevitably depend on the ability to achieve complete dispersion of the nanoplatelets in the polymer matrix of choice.

The graphene prepared by the process of the present invention may also be in the form of a graphene dispersion including an aqueous graphene dispersion which enables the use of solution phase chemistry to further functionalise the graphene sheets.

The process of the present invention involves reducing purified exfoliated graphite oxide in the presence of a base.

Graphite which consists of a stack of flat graphene sheets is inexpensive and available in large quantities both from natural and synthetic sources. Graphite oxide can be synthesised by chemical oxidation of graphite using any suitable known oxidising agents such as a combination of $H_2SO_4$, $HNO_3$ and $KClO_4$[1]; a combination of $H_2SO_4$ and $KMnO_4$[2]; or a combination of $KClO_4$ and fuming $HNO_3$[3].

Graphite oxide is hydrophilic and therefore may also be prepared in the form of a graphite oxide dispersion.

Exfoliated graphite oxide or graphene oxide can form well-dispersed aqueous dispersions. A study conducted on the surface charge (zeta potential) of as-prepared graphene oxide (GO) sheets shows that these sheets are highly negatively charged when dispersed in water (see FIG. 1a), apparently as a result of ionisation of carboxylic acid and phenolic hydroxyl groups that are known to exist on the graphene oxide sheets. This result suggests that the formation of stable graphene oxide dispersions should be attributed to electrostatic repulsion, rather than just the hydrophilicity of graphene oxide as previously presumed. Given that carboxylic acid groups are unlikely to be reduced, these groups should therefore remain in the reduced product as confirmed by FT-IR analysis (see FIG. 1b). The presence of carboxylic acid groups suggests that the surface of graphene sheets in aqueous solutions should still be charged after reduction. While not wishing to be bound by any theory, it is believed that the electrostatic repulsion mechanism that makes graphene oxide dispersions stable could also enable the formation of well-dispersed graphene dispersions. The removal of metal salts and acids such as carboxylic acid groups which often remain in the graphene oxide after reduction assist in the formation of stable graphene sheets. These residual electrolytes can neutralise the charges on the sheets, destabilising the resulting dispersions. As a consequence, it is necessary to purify the graphite oxide prior to reduction using any suitable known technique such as dialysis, filtration, and centrifugation or washing with water to remove residual salts and acids. The purified graphite oxide is exfoliated to graphene oxide by using any suitable known technique such as ultrasonication or mechanical stirring. Again, both the purified graphite oxide and the graphene oxide may be in the form of dispersions. The graphene oxide or graphene oxide dispersions may then be further purified using, for example, centrifugation, to remove any unexfoliated graphite oxide which may be present in small amounts.

The purified exfoliated graphite oxide which is now in the form of graphene oxide is then subjected to reduction in the presence of a base. The reduction is preferably a chemical reduction which involves adding a reducing agent to the graphene oxide. Examples of suitable reducing agents include inorganic reducing agents such as hydrazine or $NaBH_4$ and organic reducing agents such as hydroquinone, dimethylhydrazine or N,N'-diethylhydroxylamine. Preferably, the reducing agent is hydrazine. When the reducing agent is hydrazine, it may be added in an amount of 1.0 to 7.0 g of 35% hydrazine per gram of graphite oxide, preferably 1.5 to 5.0 g of 35% hydrazine per gram of graphite oxide, more preferably 1.5 to 2.5 g of 35% hydrazine per gram of graphite oxide.

The colloidal stability of an electrostatically stabilised dispersion is dependent on pH, the electrolyte concentration as well as the content of dispersed particles. By controlling these parameters, it has now been found graphene sheets are able to form stable colloids through electrostatic stabilisation. Graphene oxide dispersions can be directly converted to stable graphene colloids through reduction under controlled conditions. The use of polymeric or surfactant stabilisers is not required. In order to obtain maximal charge density on the resulting graphene sheets, a base is added during the reduction to increase the pH, preferably 6 or greater, more preferably 9 to 11. Examples of suitable bases include water soluble inorganic bases such as ammonia, sodium hydroxide, potassium hydroxide or water soluble organic bases such as methylamine ethanolamine, dimethylamine and trimethylamine. Preferably the base is a volatile base such as ammonia which can be removed after the graphene sheets are processed into solid films or composites. When the base is ammonia, it may be added in an amount of 7.0 to 20.0 g of 28% ammonia per gram of graphite oxide, preferably 8.0 to 16.0 g of 28% ammonia per gram of graphite oxide, more preferably 10.0 to 13.0 g of 28% ammonia per gram of graphite oxide. It will be appreciated that the amount of base is dependent on the type of base used.

The use of excess reducing agents such as hydrazine also renders the dispersion basic. However, hydrazine is highly toxic and usage should be minimized.

It has also been found that during the reduction, the graphene sheets at the liquid/air interface may agglomerate upon water evaporation and a layer of black solid gradually appears on the liquid surface. This problem can be overcome by adding a layer of water-immiscible liquid onto the dispersion to substantially eliminate the liquid/air interface. Suitable water-immiscible liquids include oils such as water immiscible oils having densities lower than water (to float on water) and boiling temperatures higher than 100° C. such as toluene, mineral oil, paraffin and hydrophobic ionic liquids. It will be understood that the amount of water-immiscible liquid will be dependent on the area of water surface. A layer of water-immiscible liquid that can substantially cover the water surface will suffice.

It has been observed that if graphene oxide dispersions with concentrations less than 0.5 mg/mL are reduced by hydrazine under these conditions, the particle size of the resulting graphene sheets does not increase after the reduction is complete (see FIG. 2a). Substantially no sediment is observed even after the dispersion has been centrifuged at 4000 RPM for several hours. Atomic force microscopy (AFM) shows that the resulting graphene sheets that are cast on a silicon wafer are flat, with a thickness of ~1 nm (see FIG. 2b). These results indicate that similar to the original graphene oxide dispersion, the graphene sheets remain separated in the dispersion. The colloidal nature of the resulting graphene dispersions is further confirmed by two experiments typically conducted in colloid science: the Tyndall effect and the salt effect. A diluted graphene dispersion gives rise to the Tyndall effect, in which a laser beam passing through a colloidal solution leaves a discernible track as a result of light scattering (see FIG. 2c). Adding an electrolyte solution, e.g. sodium chloride, into a graphene dispersion leads to immediate coagulation (see FIG. 2d). These observations are characteristic of a lyophobic colloid stabilised through electrostatic repulsion and can be explained using the Derjaguin-Landau-Verwey-Overbeek theory[4].

The feasibility of forming stable graphene dispersions through electrostatic stabilisation is further supported by zeta potential analysis. As shown in FIG. 1a, the zeta potential of the reduced graphene dispersion is pH dependent, which is consistent with the fact that the ionisation of carboxylic acid groups is strongly related to the pH. Although the magnitude of the zeta potential is lower than that of the original graphene oxide sheets at the same pH, the zeta potential is below 30 mV when the pH is greater than 6.1 and can reach −43 mV when the pH approaches 10. Zeta potential values more negative than −30 mV are generally considered to represent sufficient mutual repulsion to ensure stability of a dispersion as is well known from colloidal science[2].

The formation of stable graphene dispersions enables the reaction to be monitored using UV-Vis spectroscopy. As shown in FIG. 3, the absorption peak of the graphene oxide dispersion at 230 nm gradually red shifts to 270 nm and the absorption in the whole spectral region (>230 nm) increases with reaction time, suggesting that the electronic conjugation within the graphene sheets is restored on hydrazine reduction. Little increase in absorption is found after 1 hour, indicative of the completion of the reduction within that period. This also suggests that like conjugated polymers, the electronic conjugation level of graphene is chemically controllable, offering possibilities to tailor the optical and electrical properties of graphene sheets. Graphene sheets with different reduction levels can all form stable dispersions if they are prepared using the process of the present invention.

The graphene or graphene dispersions prepared by the process of the invention can be used in the development of graphene papers or films, graphene-based composites and articles for engineering applications. The graphene may be deposited on substrates and membranes in any suitable form including sheets, films, paper and coatings. It is envisaged that biomolecules including antibodies, growth factors and enzymes could be incorporated into the graphene. The formation of composites with other conductors including conducting polymers, metal or carbon nanotubes, metal nanoparticles, bucky balls or the formation of unique catalytic structures (e.g. containing porphyrins or enzymes) is also expected to be possible. The formation of biologically functional composites containing specific growth promoters, drugs, antibodies or other biological entities is also envisaged.

For example, it has been observed that a single layer of graphene sheets can be deposited on a substrate by drop-casting from a dilute graphene dispersion (see FIG. 2b), which provides a facile approach to obtain single graphene sheets for device fabrication or studies on the properties of individual sheets. Uniform graphene papers or films can also be readily formed on a membrane filter by vacuum filtration of as-reduced dispersions. Free-standing films or graphene paper can be peeled off from the membrane. The samples of graphene paper were then annealed at different temperatures before being cooled down to room temperature for various measurements. The resulting films are bendable and exhibit a shiny metallic luster (FIG. 4a). The conductivity is found to be ~6000 S/m at room temperature, which is comparable to that of chemically modified single-walled carbon nanotube paper[5]. Like many other lyophobic dispersions, once the graphene dispersions are dried, they are not dispersible in water any more, making as-prepared graphene films water-resistant. It has been recently demonstrated that strong graphene oxide paper can be prepared using a similar strategy[6]. The resulting paper could find use in many fields such as membranes, anisotropic conductors and supercapacitors. Preliminary measurements show that the graphene paper obtained from direct filtration of the stable graphene dispersions gives a tensile modulus up to 35 GPa, which is close to that of the graphene oxide paper. It is expected that strong, conductive, flexible, and thermally stable graphene paper should be more attractive than non-conductive, less thermally stable graphene oxide paper for practical applications.

Scanning electron microscopy (SEM) analysis reveals that the surface of the graphene paper shown in FIG. 4a is quite smooth (FIG. 5B) and the fracture edges of the papers exhibit a layered structure through the entire cross-section (FIGS. 5C and 5D), which looks similar to the microstructure obtained for graphene oxide paper prepared using the same method.[6] These results indicate that, like hydrophilic graphene oxide sheets,[6] chemically reduced graphene sheets can also be assembled to form highly ordered macroscopic structures under vacuum filtration-induced directional flow. The thickness of the graphene paper can be varied from tens of nanometers to around 10 μm by adjusting the volume of the colloidal dispersion. Nevertheless, only stable and agglomerate-free graphene colloids can produce uniform, smooth and shiny paper. In contrast to graphene oxide paper,[6] graphene paper cannot be redispersed into water by ultrasonication, exhibiting an excellent water-resistance behavior.

Another remarkable property of graphene paper is the high thermal stability, especially when compared with graphene oxide using thermogravimetric analysis (TGA) (FIG. 6A). The mass loss below 200° C. can be attributed to the evaporation of adsorbed water. A slight mass loss appears between 200° C. and 500° C., presumably owing to the decomposition of some residual oxygen-containing groups. In contrast to graphene oxide paper, there is no sharp weight loss at around 200° C. for graphene paper, indicating that most oxygen-containing groups have been removed by the hydrazine reduction. The total weight loss (<10%) of graphene paper between 200° C. and 500° C. is much lower than that of graphene oxide paper (~30% loss). When graphene paper is annealed between 200° C. and 500° C., the mechanical integrity of the paper as well as the physical appearance (smooth shiny surface) are retained. In fact, the lustrous appearance is enhanced by thermal annealing. In contrast, when graphene oxide paper is treated above 200° C., the paper becomes crumpled, presumably as a result of vigorous gas release caused by thermal decomposition.[12] These results clearly indicate that paper composed of chemically reduced graphene is much more thermally stable than unreduced graphene oxide paper.

The effect of thermal annealing on the microstructural ordering of graphene sheets was studied in the resulting paper using X-ray diffraction. As shown in FIG. 6B, as-filtrated graphene paper, when dried at room temperature, displays a weak and broad X-ray diffraction peak at around 23° C., corresponding to a layer-to-layer distance (d-spacing) of about 0.387 nm. As the annealing temperature is increased, the peak at around 23° C. becomes more pronounced and sharper. The d-spacing is slightly reduced, approaching 0.341 nm when treated at 500° C. The XRD results clearly indicate that thermal annealing enables a better ordering of the two-dimensional sheets. Note that the d-spacing of the resulting graphene paper is slightly greater than, but quite close to that of graphene layers in pristine natural graphite, indicating that chemically prepared graphene sheets are similar to the pristine sheets. The slightly increased d-spacing of chemically prepared graphene paper can be ascribed to the presence of a small amount of residual oxygen-containing functional groups or other structural defects.

As a consequence of better ordering and additional deoxygenation by thermal annealing, the electrical conductivity of graphene paper is found to increase with treatment temperature (FIG. 6C). It is noteworthy that although graphene oxide can be converted to conductive graphene by thermal deoxygenation, the electrical conductivity of thermally treated graphene oxide paper is found to be lower than that of the graphene paper of the present invention, most likely owing to the disrupted structure of heat treated graphene oxide. For example, the conductivity of graphene oxide paper heat treated at 220 and 500° C. is around 0.8 and 59 S/cm, respectively, while the graphene paper of the present invention treated at the same temperatures exhibits a conductivity of 118 and 351 S/cm, respectively. The conductivity of the graphene paper sample treated at 500° C. is an order of magnitude higher than that reported for compressed pristine graphite powder, again indicative of a strong inter-sheet interaction in the graphene paper.[12]

Similar to graphene oxide prepared using the same method,[6] graphene paper is supposed to be formed by stacking and interlocking of individual sheets under a filtration-induced directional flow. Given that individual graphene sheets are predicted to have a tensile modulus of up to 1.01 TPa[13] and the sheets are well packed in graphene paper, it is postulated that like graphene oxide paper, graphene paper should have excellent mechanical properties. Mechanical analysis of the graphene paper reveals that the stiffness and tensile strength is comparable to or, if properly annealed, higher than those of graphene oxide paper. FIG. 7A presents typical stress-strain curves of graphene paper annealed at various temperatures. The results obtained using the samples dried at room temperature show an elastic and a plastic deformation region as well as an initial straightening region similar to those observed for graphene oxide paper.[6] When the samples are annealed at temperatures above 100° C., the plastic deformation is difficult to observe (FIG. 7A). The stiffness and strength of graphene paper samples are found to be dependent on the thermal annealing temperature used. As shown in FIGS. 6B and 6C, both stiffness and strength increase with increasing annealing temperature up to about 220° C. The enhancement of mechanical properties is attributed to the better ordering of graphene stacks brought about by thermal annealing, which results in enhanced inter-layer contact and interactions of graphene sheets. This is consistent with the XRD and electrical conductivity measurement results. The sample annealed at 220° C. yields the greatest mean Young's modulus at 41.8 GPa, and the greatest mean tensile strength at 293.3 MPa. Although the values are still much lower than those of individual sheets (likely due to the weaker bonding between sheets), they are both higher than those of graphene oxide paper and over ten times higher than the corresponding values for flexible graphite foils[6,14,15]. When the heat treatment is performed at temperatures above 220° C., the graphene paper becomes more brittle and the measured stiffness and strength tend to decrease with annealing temperature.

Note that for graphene oxide paper samples, their mechanical properties are comparable to those of graphene paper when thermally annealed below 150° C. However, both stiffness and strength are significantly reduced when treated at 220° C. (FIGS. 6B and 6C) as a sequence of structural destruction caused by thermal decomposition.

Carbon materials have proven to be promising for biomedical applications such as tissue engineering and implants, in part due to their inherent biocompatibility. To our knowledge, there have been no reports regarding the biocompatibility of chemically prepared graphene-based materials. Graphene paper offers an ideal platform for cell culture experiments due to the ease of handling. Initial biocompatibility assessment of the graphene papers is addressed by culture of the mouse fibroblast cell line (L-929), which is commonly used to assess cytotoxicity of potential substrates for cell growth, and has been used previously in biocompatibility testing of carbon nanotubes.[16] L-929 cells are found to adhere to and proliferate on the graphene papers, such that by 48 h of culture time a sub-confluent layer of metabolically active cells can be visualized (FIG. 8). The doubling time for the cells is the same on graphene papers as on commercial polystyrene tissue culture plastic, indicating normal proliferation rates on these materials. Thus graphene paper provides a good substrate for the adhesion and proliferation of L-929 cells, suggesting that chemically-prepared graphene may be a biocompatible material.

Spraying techniques such as air-brushing can also be used to produce conductive graphene coatings on various substrates. Of particular significance is that owing to the high aspect ratio of the graphene sheets, a few layers of graphene sheets, which are almost transparent, can result in the formation of a continuous conducting network. FIG. 4b shows a transmittance spectrum of a sprayed graphene coating on a glass slide. The coating gives a sheet resistivity of $2.0 \times 10^7 \Omega/\square$ at room temperature, while the transmittance in the visible wavelength range is higher than 96%. The conductivity of this as-sprayed coating is sufficient for antistatic applications. Antistatic coatings are vital to the safety of materials, machinery and individuals across many different industries. This could lead to the development of a new generation of antistatic coatings that can combine electrical conductivity with transparency, excellent thermal and chemical stability, water-resistance and low production cost. Graphene dispersions may thus find immediate practical uses.

Additionally, the highly charged state of the graphene sheets in water makes it possible to use the known layer-by-layer electrostatic assembly technique[7-11] to build up complex and controllable graphene-based nanosystems with other functional molecules, polymers and nanostructures. This possibility has been demonstrated by alternately immersing a quartz slide in a dilute graphene dispersion and a typical cation polyelectrolyte-poly(diallyldimethylammonium chloride). As confirmed by the absorption spectra (FIG. 4c) and the AFM analysis (similar to FIG. 2b and therefore not shown), graphene sheets can be successfully assembled using this approach. Thin films of graphite oxide sheets have been previously prepared using this technique. However, to make the resulting graphite oxide film conducting, an additional reduction step is needed. This reduction process is likely to be detrimental to composites containing more delicate molecular structures such as biomolecules or conjugated polymers. It has been extensively demonstrated that self-assembled multilayered electroactive films hold great potential in many applications such as sensors and neuroprosthetic devices. It would be reasonable to expect that the successful formation of graphene dispersions will open up the door to use this powerful electrostatic assembly technique to manipulate graphene sheets for creating many new and potentially useful nanosystems.

In summary, it has been demonstrated that aqueous graphene dispersions can be readily formed by reduction of graphene oxide without the need for either polymeric or surfactant stabilisers. Graphene sheets are superior to normal synthetic conducting polymers in terms of thermal and chemical stability and mechanical strength, and more competitive than carbon nanotubes in terms of production cost. Furthermore, as shown with carbon nanotubes, the successful dissolution of graphene sheets in solution as well as the residual carboxylic groups on the sheets enables the use of solution-phase chemistry to further functionalise graphene sheets for new uses. The ease of synthesis and the exceptional solution-phase processability of graphene sheets make this conductive nanostructure attractive not only for future nanoelectronics, but also for large-scale applications in both conventional technological fields, e.g. transparent antistatic coatings and electrochemical devices, and emerging areas, e.g. flexible/transparent electronics, high-performance nanocomposites, nanomedicines and bionic materials.

In a particular application, the graphene can be used to prepare transparent conductive coatings to be used for example on LCD and other visual screens including flexible screen technology.

It has also been demonstrated that highly ordered graphene paper can be prepared by directional flow-induced assembly of graphene sheets that are well dispersed in solution. Moderate thermal annealing can enhance its mechanical stiffness and strength as well as electrical conductivity. The results of cell culture experiments also indicate that graphene paper may be biocompatible and therefore suitable for biomedical applications. The combination of the exceptional mechanical strength, thermal stability, high electrical conductivity and biocompatibility makes graphene paper a promising material for many technological applications from electrodes for flexible batteries to biomedical applications, such as inclusion in heart valves.

EXAMPLES

Figure 1:
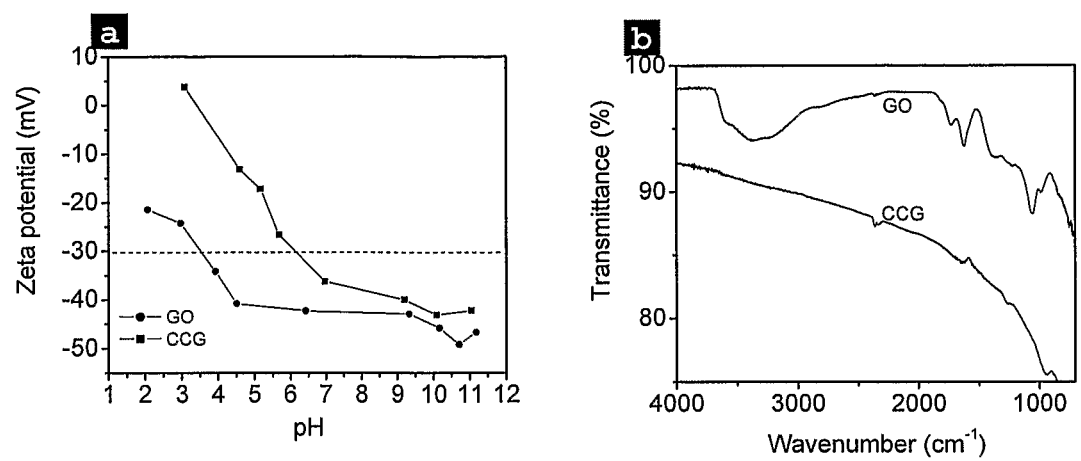
FIG. 1 are graphs showing surface properties of graphene oxide (GO) and chemically converted graphene (CCG). a. Zeta potential of GO and CCG as a function of pH, in aqueous dispersions at a concentration of 0.05 mg/mL. b. FT-IR spectra of GO and CCG. The absorption band at around 1700 cm$^{-1}$ is attributed to carboxyl groups. The absorption of CCG sheets at this range is observable but not as prominent as that observed for GO, likely due to the overlapping of the strong absorption of graphene sheets in this region.
Figure 2:
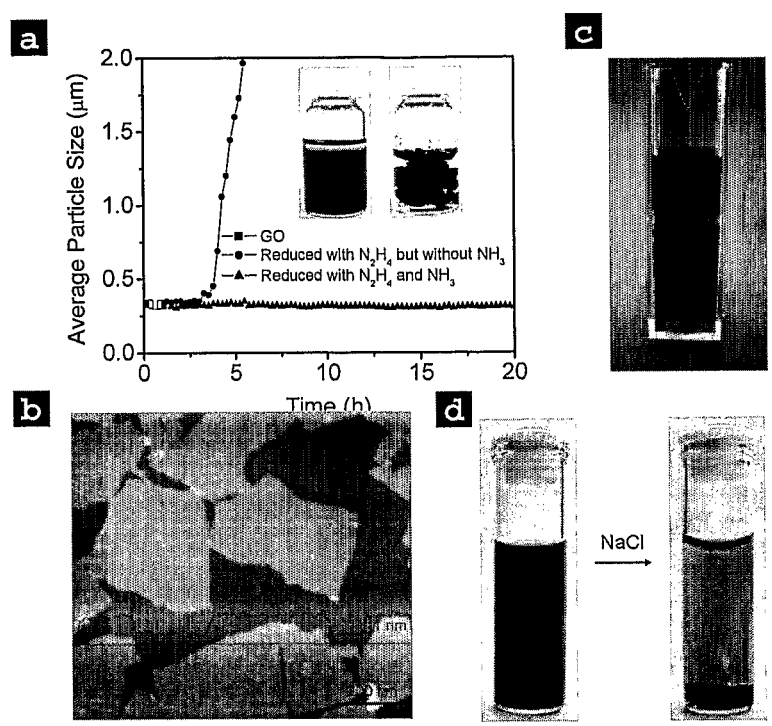
FIG. 2 are graphs and photographs showing colloidal and morphological characterization of CCG dispersions. a. The effect of the addition of ammonia on the dispersion state of CCG sheets, characterized by measuring the average particle sizes over a long period of time. The photographs shown in the inset were taken two days later after the reduction reaction was complete with (left) and without (right) the addition of ammonia. The concentration of the starting graphene oxide solution is 0.25 mg/mL. b. Tapping-mode AFM image of CCG sheets with a height profile taken along the straight line. The sample was prepared by drop-casting a dilute CCG dispersion onto a silicon wafer. c and d. The Tyndall effect and salt effect confirming the colloidal nature of the CCG dispersions. The salt effect experiment highlights the importance of removal of residual salts and acids from the graphene oxide dispersion.
Figure 3:
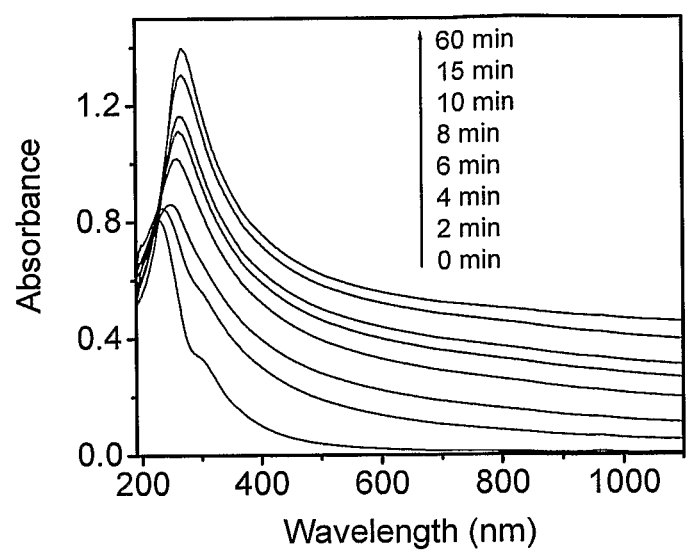
FIG. 3 is a UV-Vis absorption spectra showing the change of graphene oxide dispersions as a function of reaction time.
Figure 4:
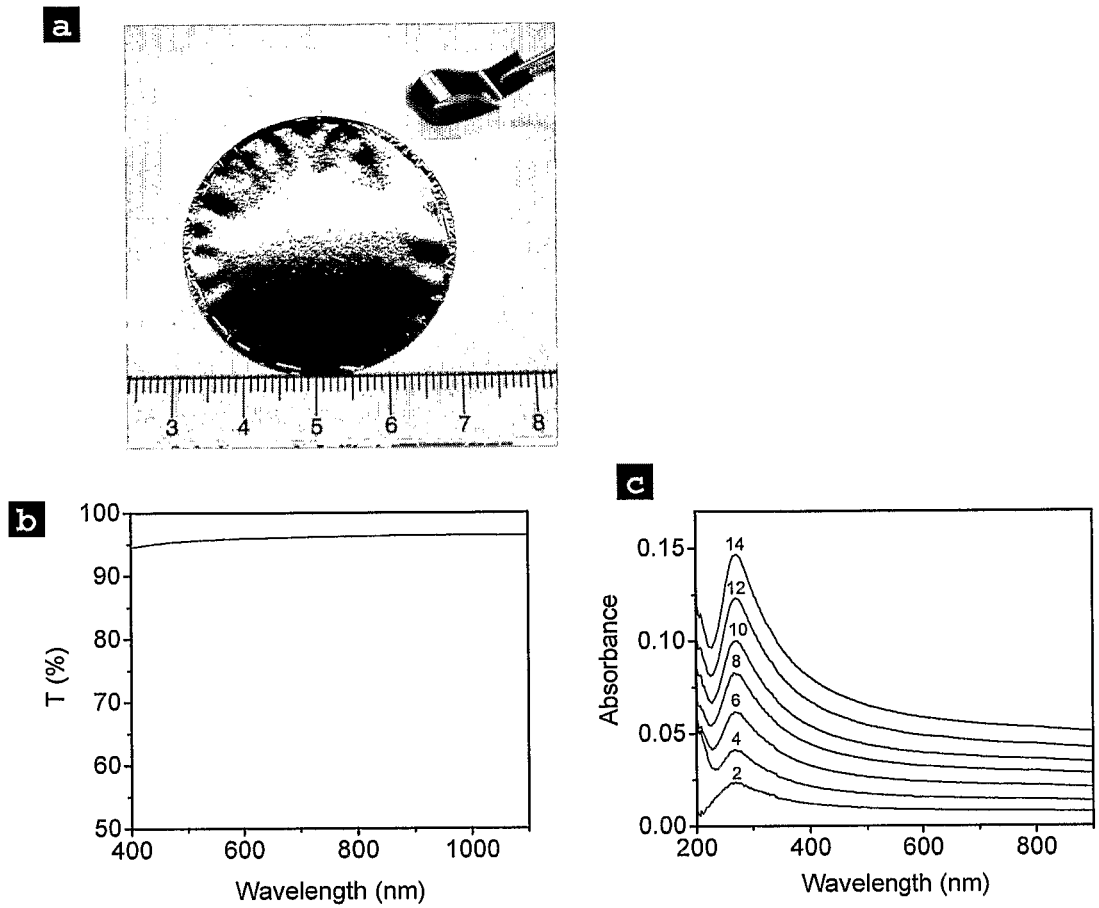
FIG. 4 are photographs and graphs demonstrating that films made of CCG sheets can be easily fabricated from CCG dispersions using various solution-phase processing techniques. a. A 10 μm-thick CCG film or paper prepared by vacuum filtration of a CCG dispersion through an alumina membrane. The film exhibits a shiny metallic luster. A CCG strip (top-right inset) cut from the film is bent to demonstrate its flexibility; b. A transmission spectrum of a CCG coating deposited on a glass slide by air-brush spraying of a CCG solution. The transmittance in the visible light range is greater than 96%; c. UV-Vis spectra of polycation/CCG films prepared by a layer-by-layer electrostatic self-assembly technique. The absorbance increases linearly with an increase in the number of assembly cycles (denoted above each curves), indicative of the successful assembly of CCG sheets on the substrate.
Figure 5:
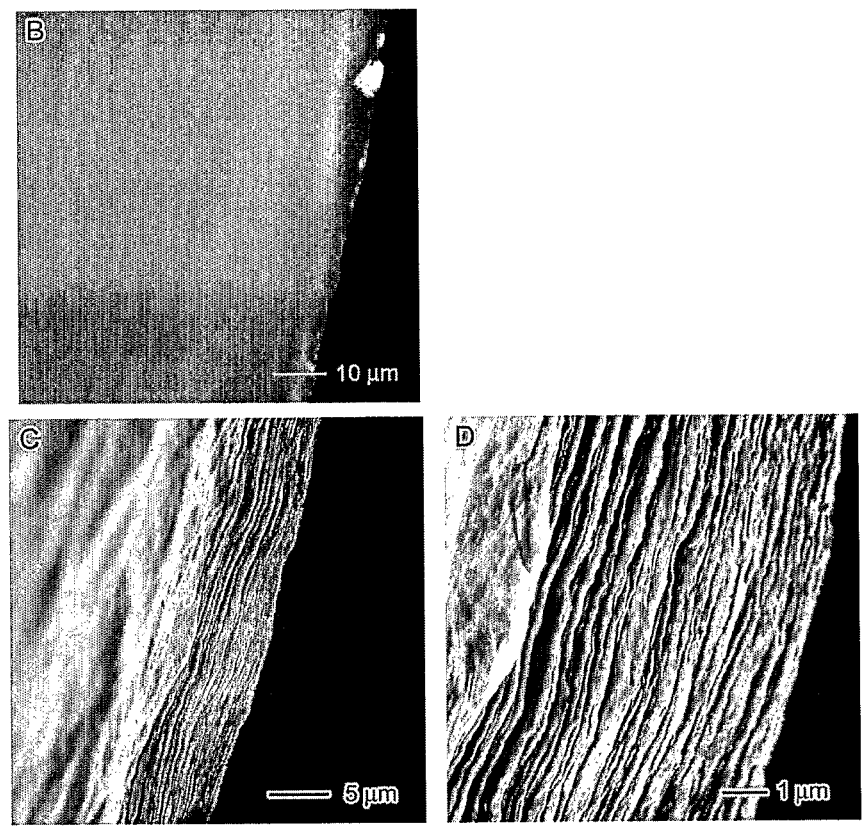
FIG. 5 are photographs of a top-view SEM image of the graphene paper sample of FIG. 4a showing the smooth surface and C,D) side view SEM images of a ca. 6 μm thick sample at increasing magnification.
Figure 6:
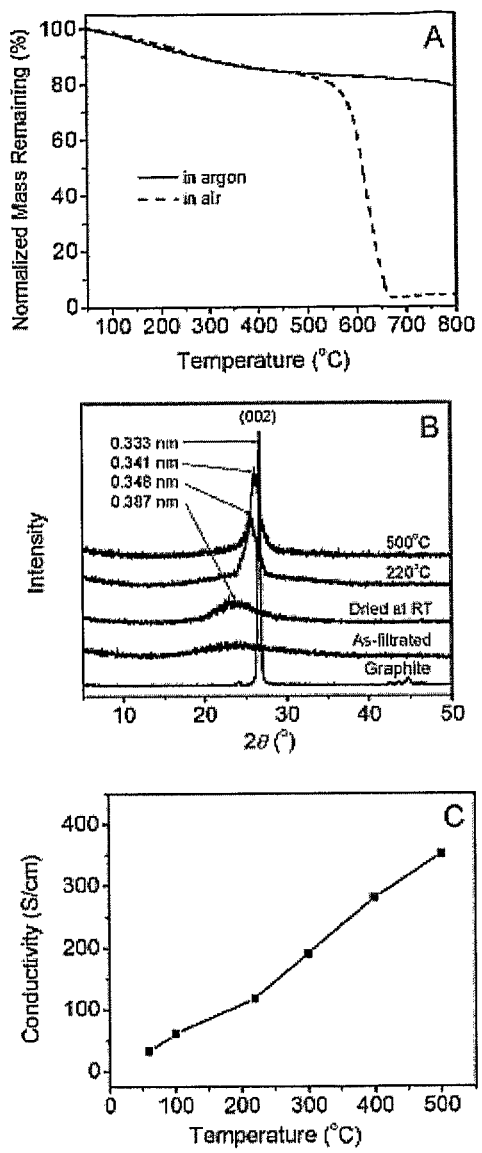
FIG. 6 are graphs showing A) normalized remaining mass of graphene paper as a function of temperature in air and argon gas, respectively. B) XRD patterns of graphene paper samples that have been heat treated at various temperatures. For comparison, the XRD pattern of pristine graphite powder is included. All the XRD patterns were recorded at room temperature. C) Room temperature electrical conductivity of graphene samples that have been thermally annealed at various temperatures.
Figure 7:
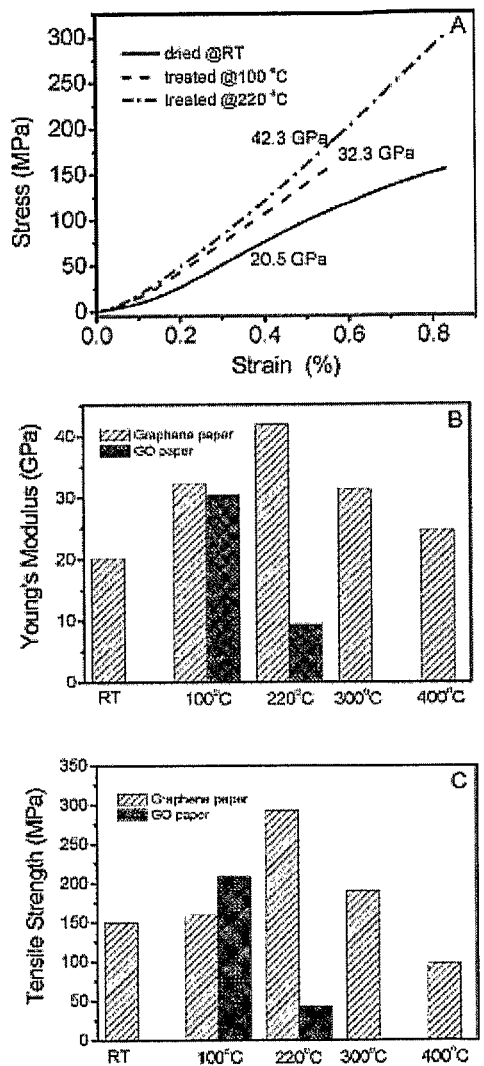
FIG. 7 are graphs showing A) typical stress-strain curves, B) Young's modulus, and C) tensile strength of graphene paper strips that have been heat-treated at various temperatures. The mechanical properties of GO paper are also presented in (B) and (C) for comparison. The data shown in (B) and (C) are averages of six measurements.
Figure 8:
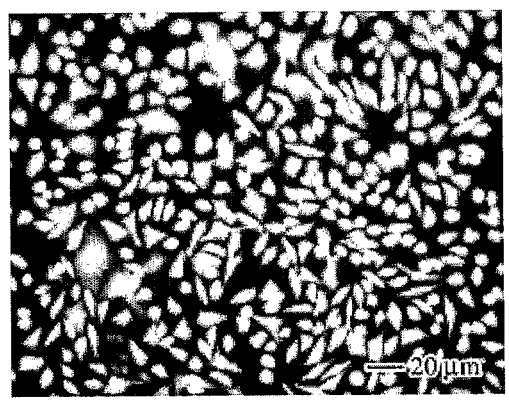
FIG. 8 is a fluorescence microscopy image of calcein-stained L-929 cells growing on graphene paper.
Figure 9:
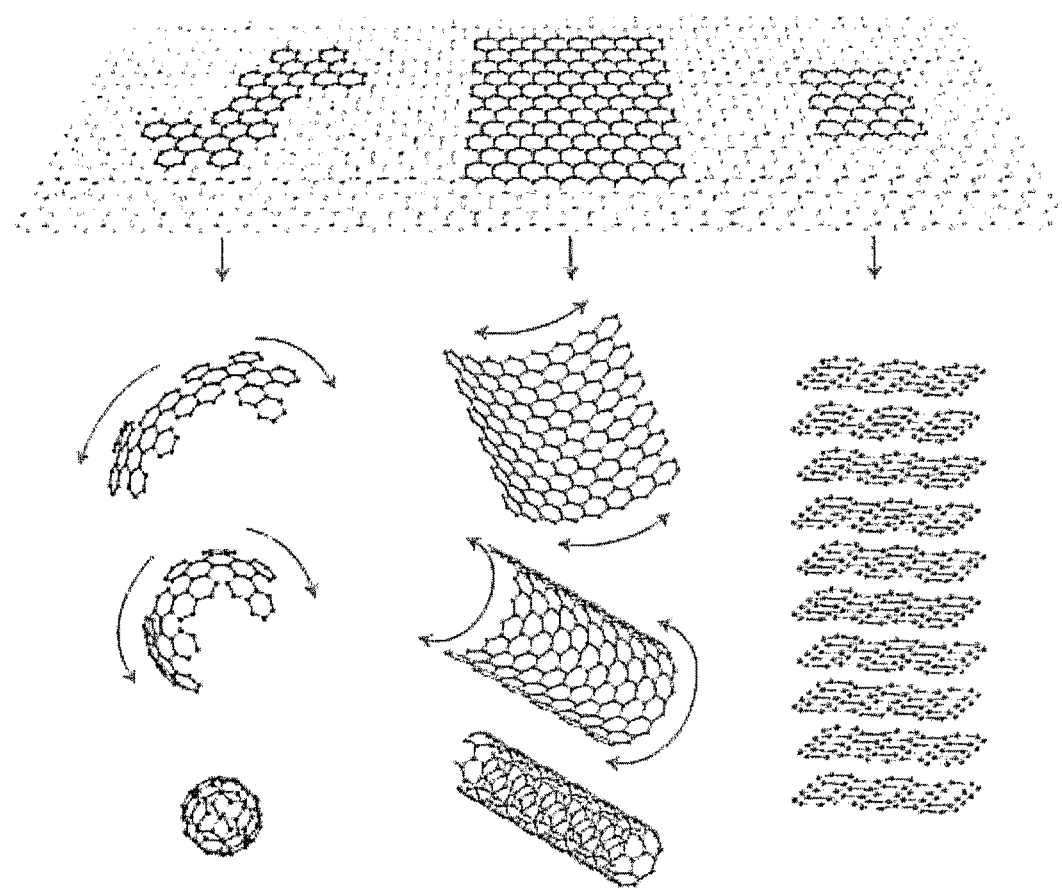
FIG. 9 is a diagram showing that graphene is essentially an individual layer of graphite and can be regarded as a carbon nanotube unrolled.

The present invention will now be described with reference to the following non-limiting examples.

Example 1

Synthesis

Graphite oxide was synthesised from natural graphite (SP-1, Bay Carbon) by applying the Hummers method[1] with an additional dialysis step used to purify the product. As-synthesized graphite oxide was suspended in water to give a brown dispersion, which was subjected to dialysis to completely remove residual salts and acids. Ultrapure Milli-Q® water was used in all experiments. As-purified graphite oxide suspensions were then dispersed in water to create a 0.05 wt % dispersion. Exfoliation of graphite oxide to graphene oxide was achieved by ultrasonication of the dispersion using a Brandson Digital Sonifier (S450D, 500 W, 30% amplitude) for 30 min. The obtained brown dispersion was then subjected to 30 min of centrifugation at 3000 RPM to remove any unexfoliated graphite oxide (usually present in a very small amount). In order to achieve chemical conversion of graphite oxide to graphene, the resulting homogeneous dispersion (5.0 mL) was mixed with 5.0 mL of water, 5.0 μL of hydrazine solution (35 wt % in water, Aldrich) and 35.0 μL of ammonia solution (28 wt % in water, Crown Scientific) in a 20 mL-glass vial. After being vigorously shaken or stirred for a few minutes, the vial was put in a water bath (~95° C.) for 1 h. The excess hydrazine in the reaction mixture can be removed by dialysis against a dilute ammonia solution.

Characterisation

UV-visible absorption and/or transmission spectra were taken using a Shimadzu UV 1601 spectrophotometer. The spectra were taken from the reaction mixture (diluted by a factor of 30) at different times. The dispersion/aggregation state of CCG sheets in water was monitored by measuring their average particle size using a Malvern Zetasizer Nano-ZS particle analyzer. Note that the particle size measurement on this instrument is based on the assumption that the particles are spherical, thus the instrument is unable to give the absolute sizes of graphene sheets. Nevertheless, the measurements obtained provide a means of monitoring dispersion stability. Attenuated total reflectance FT-IR spectra of free-standing films prepared by vacuum filtration were recorded on a Nicolet AVATAR 360 FTIR spectrometer with a Smart OMNI Sampler with a germanium crystal. AFM images were taken in tapping mode with the SPM Dimension 3100 from Veeco. Conductivity measurements of free-standing CCG films prepared by vacuum filtration were carried out on a Jandel RM3 Test Unit using a 4-point-probe head with a pin-distance of about 1 mm.

Example 2

Fabrication of Graphene Paper: Graphene paper was fabricated by vacuum filtration of graphene dispersions. In a typical procedure, graphite oxide was synthesized from natural graphite powder (SP-1, Bay Carbon, Bay City, Mich.) using a modified Hummers method[2,17]. After being purified by filtration and subsequent dialysis or by several runs of centrifugation/washing, graphite oxide was exfoliated into water by ultrasonication for 30 min using a Branson Digital Sonifier (S450D, 500 W, 30% amplitude). The obtained graphene oxide was diluted to 0.25 mg mL$^{-1}$. With the pH of the dispersion adjusted to 10 using ammonia and the solution surface covered with a thin layer of mineral oil, the dispersion was then subjected to reduction at ~95° C. by hydrazine for 1 h. Graphene paper was made by filtration of a measured amount of the resulting colloid through an Anodisc membrane filter (47 mm in diameter, 0.2 μm pore size, Whatman), followed by air drying and peeling from the filter. Unless specifically stated, graphene paper with a thickness of around 6 μm was used for all measurements reported in this work. These samples of graphene paper were annealed at different temperatures in air (<220° C.) or argon (>220° C.) for 1 h before being cooled down to room temperature for various measurements. For comparison, graphene oxide paper was also prepared, using a similar filtration method, as reported in Reference 6.

Structural and Properties Characterization: The thermal properties of the graphene papers were characterized by thermogravimetric analysis (TGA Q500, TA Instruments). All measurements were conducted under air or nitrogen gas at a flow rate of 40 mL min$^{-1}$ over a temperature range of 30-800° C. with a ramp rate of 5° C. min$^{-1}$. The XRD patterns of graphene paper samples annealed at different temperatures were recorded on an Australia GBC Scientific X-ray diffractometer (40 kV, 20 mA, Cu Kα radiation, λ=1.5418 Å) at room temperature. Static uniaxial in-plane tensile tests were conducted with a dynamic mechanical analyzer (DMA Q800, TA Instruments). The samples were cut with a razor into rectangular strips of approximately 3 mm×15 mm for mechanical testing and were gripped using a film tension clamp with a clamp compliance of about 0.2 μm All tensile tests were conducted in controlled strain rate mode with a preload of 0.01 N and a strain ramp rate of 0.05% min$^{-1}$. Conductivity measurements were carried out on a Jandel RM3 Conductivity Meter using a 4-point-probe head. SEM images were obtained using a Hitachi S-900 field-emission scanning electron microscope operated at an accelerating voltage of 4 kV.

Biocompatibility Test Graphene paper that was thermally annealed at 100° C. was screened for biocompatibility by monitoring the growth of L-929 (mouse fibroblast) cells. The graphene paper samples were placed into wells of a 96 well polystyrene cell culture plate and soaked overnight in two changes of culture media, then rinsed with water to remove soluble impurities. The samples were sterilized by rinsing with 70% ethanol, followed by air-drying and placing under UV light for 20 min. Samples were seeded with 5×103 L-929 mouse fibroblast cells per well, and cultured in DMEM:F12 media supplemented with 5% FBS for 48 h. Finally the cells were stained with Calcein AM, which was cleaved to yield a green fluorescent product by metabolically active cells. Images were obtained using a Leica DMIL inverted fluorescence microscope equipped with a Leica DC500 camera.

References

1. L. Staudenmaier, Ber. Deutsch. Chem. Ges. 31 (1898) 1481.
2. Hummers, W. S. & Offeman, R. E. Preparation of graphite oxide. J. Am. Chem. Soc. 80, 1339 (1958).
3. B. C. Brodie, Phil. Trans. R. Soc. London Ser. A 149 (1859) 249, J. Maire, C. R. Acad. Sci. Paris 232 (1951) 61.
4. Everett, D. H. Basic Principles of Colloid Science. The Royal Society of Chemistry, 1988.
5. Skakalova, V., Kaiser, A. B., Dettlaff-Weglikowska, U., Hrncarikova, K. & Roth, S. Effect of chemical treatment on electrical conductivity, infrared absorption, and Raman spectra of single-walled carbon nanotubes. J. Phys. Chem. B 109, 7174-7181 (2005).
6. Dikin, D. A. et al. Preparation and characterization of graphene oxide paper. Nature 448, 457-460 (2007).
7. Decher, G. Fuzzy nanoassemblies: Toward layered polymeric multicomposites. Science 277, 1232-1237 (1997).
8. Hammond, P. T. Form and function in multilayer assembly: New applications at the nanoscale. Adv. Mater. 16, 1271-1293 (2004).
9. Tang, Z. Y., Wang, Y., Podsiadlo, P. & Kotov, N. A. Biomedical applications of layer-by-layer assembly: From biomimetics to tissue engineering Adv. Mater. 18, 3203-3224 (2006).
10. Gheith, M. K., Sinani, V. A., Wicksted, J. P., Matts, R. L. & Kotov, N. A. Single-walled carbon nanotube polyelectrolyte multilayers and freestanding films as a biocompatible platform for neuroprosthetic implants. Adv. Mater. 17, 2663-2670 (2005).
11. Jan, E. & Kotov, N. A. Successful differentiation of mouse neural stem cells on layer-by-layer assembled single-walled carbon nanotubes composite. Nano Lett. 7, 1123-1128 (2007).
12. S. Stankovich, D. A. Dikin, R. D. Piner, K. A. Kohlhaas, A. Kleinhammes, Y. Jia, Y. Wu, S. T. Nguyen, Ruoff, R. S. Carbon 2007, 45, 1558.
13. M. J. McAllister, J. L. LiO, D. H. Adamson, H. C. Schniepp, A. A. Abdala, J. Liu, M. Herrera-Alonso, D. L. Milius, R. CarO, R. K. Prud'homme, I. Aksay, Chem. Mater. 2007, 19, 4396.
14. M. B. Dowell, R. A. Howard, Carbon 1986, 24, 311.
15. Y. Leng, J. L. Gu, W. Q. Cao, T. Y. Zhang, Carbon 1998, 36, 875.
16. M. A. Correa-Duarte, N. Wagner, J. Rojas-Chapana, C. Morsczeck, M. Thie, M. Giersig, Nano Lett. 2004, 4, 2233.
17. N. I. Kovtyukhova, P. J. Ollivier, B. R. Martin, T. E. Mallouk, S. A. Chizhik, E. V. Buzaneva, A. D. Gorchinskiy, Chem. Mater. 1999, 11, 771.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A process for the preparation of a stable graphene dispersion which comprises reducing a graphene oxide dispersion by adding a reducing agent in the presence of a base.

2. The process according to claim 1, in which the graphene dispersion is solution-processable.

3. The process according to claim 1, in which the graphene dispersion is water-based.

4. The process according to claim 1, in which the reducing agent is an inorganic or organic reducing agent.

5. The process according to claim 4, in which the inorganic reducing agent is hydrazine or $NaBH_4$.

6. The process according to claim 5, in which the hydrazine is added in an amount of 1.0 to 7.0 g of 35% hydrazine per gram of graphene oxide.

7. The process according to claim 4, in which the organic reducing agent is hydroquinone, dimethylhydrazine or N,N'-diethylhydroxylamine.

8. The process according to claim 1, in which the base is a water soluble inorganic or organic base.

9. The process according to claim 8, in which the water soluble inorganic base is ammonia, sodium hydroxide, or potassium hydroxide.

10. The process according to claim 9, in which the ammonia is added in an amount of 7.0 to 20.0g of 28% ammonia per gram of graphene oxide.

11. The process according to claim 8, in which the water soluble organic base is methylamine ethanolamine, dimethylamine or trimethylamine.

12. The process according to claim 1, in which the graphene oxide is prepared by chemical oxidation of graphite to form graphite oxide which is then purified and exfoliated.

13. The process according to claim 12, in which the graphite oxide is purified by dialysis, filtration, centrifugation or washing with water.

14. The process according to claim 12, in which the graphite oxide is exfoliated by ultrasonication or mechanical stirring.

15. The process according to claim 1, in which a water immiscible liquid is added before or during the reduction.

16. The process according to claim 1, in which the reducing agent is in the form of a solution.

17. The process according to claim 1, in which the base is in the form of a solution.

18. The process according to claim 1, in which the graphene oxide is present in the dispersion at a concentration of less than 0.5mg/mL.

19. The process according to claim 5, in which the hydrazine is added in an amount of 1.5 to 5.0 g of 35% hydrazine per gram of graphene oxide.

20. The process according to claim 5, in which the hydrazine is added in an amount of 1.5 to 2.5 g of 35% hydrazine per gram of graphene oxide.

21. The process according to claim 9, in which the ammonia is added in an amount of 8.0 to 16.0 g of 28% ammonia per gram of graphene oxide.

22. The process according to claim 9, in which the ammonia is added in an amount of 10.0 to 13.0 g of 28% ammonia per gram of graphene oxide.

23. The process according to claim 1, in which the base is added to increase the pH of the graphene oxide dispersion to 6 or greater.

24. The process according to claim 23, in which the pH of the graphene oxide dispersion is 9 to 11.

* * * * *

UNITED STATES PATENT AND TRADEMARK OFFICE
CERTIFICATE OF CORRECTION

PATENT NO. : 8,715,610 B2  Page 1 of 1
APPLICATION NO. : 12/738758
DATED : May 6, 2014
INVENTOR(S) : Wallace et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twenty-ninth Day of September, 2015

Michelle K. Lee
*Director of the United States Patent and Trademark Office*